Jan. 5, 1954  A. F. FALLON  2,665,136
ADJUSTABLE SPLINED ARBOR
Filed Jan. 25, 1952
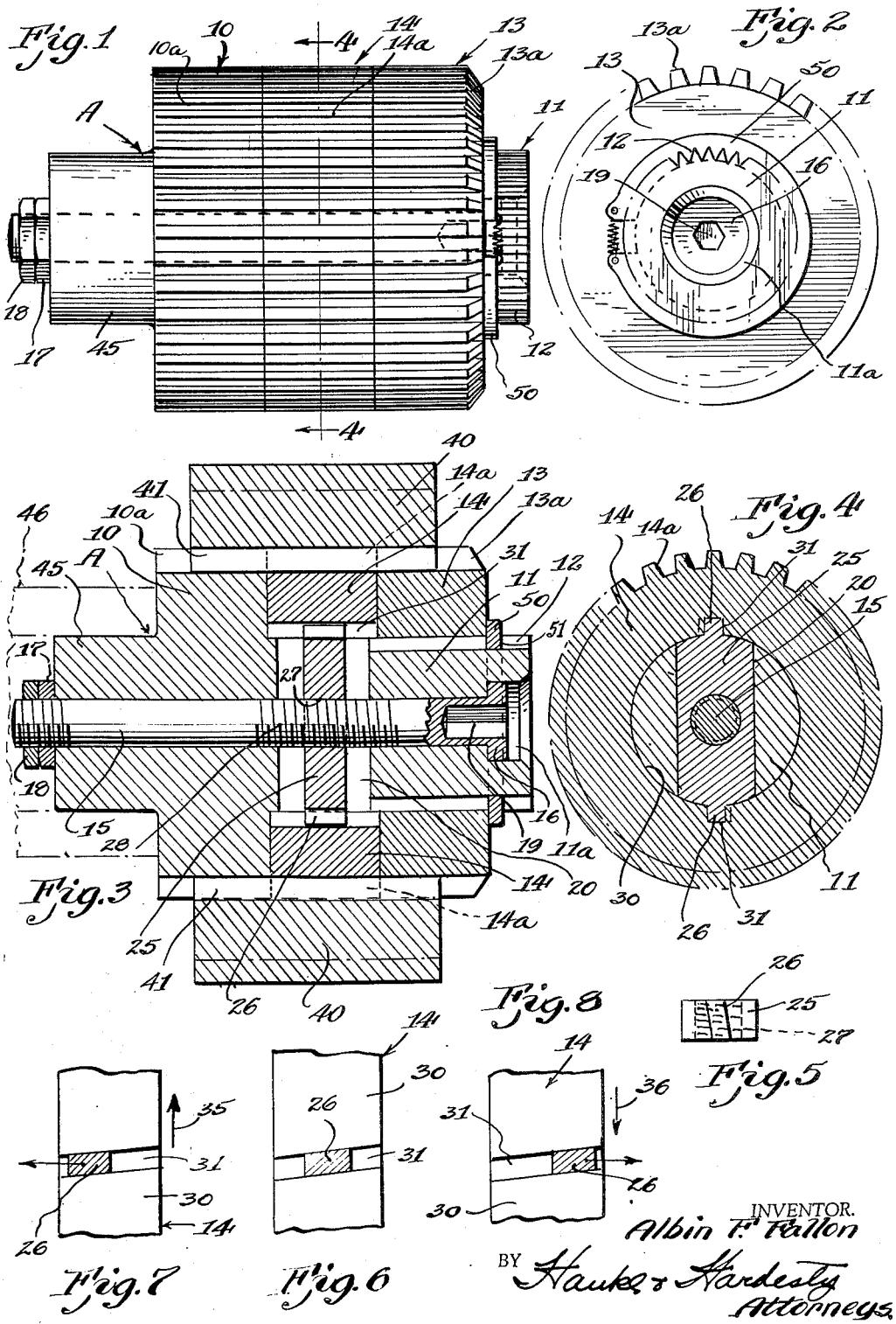
INVENTOR.
Albin F. Fallon
BY Hauke & Hardesty
Attorneys Patented Jan. 5, 1954

2,665,136

UNITED STATES PATENT OFFICE 2,665,136

ADJUSTABLE SPLINED ARBOR

Albin F. Fallon, Grosse Pointe Park, Mich.

Application January 25, 1952, Serial No. 268,249

8 Claims. (Cl. 279—1)

My invention relates to arbors, and more particularly to that type known throughout the trade as splined arbors.

In the manufacture of gears or the mounting of gears and pinions on shafts and the like, it is observed that such gear blanks which are internally splined to be mounted on centered or a splined arbor are not securely centered because of the fact these internal splines are machined with a tolerance of some two or five thousandths, resulting in a limited amount of play. To overcome the aforesaid difficulties I have devised an arbor construction operable to securely fix and center the internally splined workpiece on said arbor.

It is an object of my invention to overcome the difficulties attendant in the application and use of splined arbors in the making of gears, pinions and the like by providing an adjustable splined arbor readily usable for production and which can be more readily and securely locked in adjustment, whereby to positively hold the workpiece securely centered on the arbor.

Further objects of my invention are to provide an improved adjustable arbor for supporting a workpiece by constructing same with an improved and simplified adjusting mechanism, more particularly constructed to adjust an intermediate toothed ring relative to the annular toothed portion of the arbor support, whereby to more securely hold the workpiece centered on the arbor.

For a more detailed understanding of my invention, reference may be had to the accompanying drawing illustrating a preferred embodiment of my invention in which like characters refer to like parts throughout the several views, and in which Fig. 1 is a side view of my improved adjustable splined arbor.

Fig. 2 is an end elevational view thereof.

Fig. 3 is a longitudinal sectional view of the arbor illustrated in Fig. 1.

Fig. 4 is a detail transverse sectional view thereof taken substantially on the line 4—4 of Fig. 1.

Fig. 5 is a detail plan elevational view of the adjustable actuator.

Fig. 6 is a fragmentary developed plan view of the middle toothed ring of the arbor assembly showing the adjustable feature and the means for tying the said ring to the adjustable actuator.

Fig. 7 is a similar developed view showing how said ring is adjusted in one direction by a longitudinal adjustment of the actuator, and Fig. 8 is a similar view showing how the ring may be adjusted in the opposite direction by a reverse movement or adjustment of the actuator.

The adjustable splined arbor as constructed in accordance with my invention comprises a main arbor support A provided with an externally splined or toothed annular portion 10 and an axially extending shaft 11, the extreme end of said shaft being serrated as at 12 or otherwise provided with one or more external splines adapted to receive and position on said shaft a second externally splined or toothed annular portion 13. The external teeth on these first and second annular portions are substantially identical, being substantially of the same pitch and dimensions, said teeth being also substantially aligned. Said second annular portion 13 is located and so aligned by means of the interserrated construction aforesaid.

An intermediate externally splined or toothed ring 14 is mounted on the shaft 11 and is tightly clamped between the first and second annular portions by a bolt 15, one head 16 of the bolt seating in the recess 11a in the end of the shaft 11, and the other end of the bolt being screw threaded and arranged to receive a nut 17 and lock nut 18.

This bolt and nut assembly is adapted to freely rotate in the support 10 and is further disposed axially of the shaft 11. The end of the bolt is provided with a socket 19 to receive an "Allen" wrench. The shaft is provided with an elongated slot 20, said slot being located in that portion of the shaft on which the ring 14 is mounted and is further located substantially centrally with respect to said ring. An actuator 25 is mounted on this slot and is provided with one or more projections 26 extending beyond the external surface of the shaft 11. (See Figs. 3 and 4.) This actuator is provided with a threaded bore 27 adapted to engage the threaded medial portion 28 of the bolt 15.

The medial ring 14 is provided with a central bore or hole 30 engaging the shaft 11 and is thus rotatably mounted on the shaft 11. An internal helical groove 31 is carried by the ring 14 and the projection 26 of the longitudinally adjustable actuator 25 is engaged in this groove 31. One or more of these tongue and groove connections may be provided, and preferably I provide at least a pair of such tongue and groove connections. The projection 26 may be termed a tooth and preferably said projections are constructed as generally helical to fit the helical grooves 31.

In the position of this ring as shown in Figs. 3 and 6, the projection or tooth 26 is substantially at the middle of the slot. Longitudinal adjustment of this actuator 25, which adjustment is had by turning or rotating the bolt 15, will adjust the angular position of the ring relative to the externally splined or toothed portions 10 and 13. Movement of the actuator to the left (Fig. 7) will move or angularly adjust the ring 14 in one direction as indicated by the arrow 35, while movement or adjustment of the actuator to the right (Fig. 8) will move or angularly adjust the ring 14 in the opposite direction, as indicated by the arrow 36.

In the position of the parts as illustrated in Figs. 3 and 6, the external splines or teeth 14a on the ring 14 are substantially aligned with the external splines or teeth 10a and 13a respectively on the annular portions 10 and 13 of the arbor A.

A workpiece 40 is internally splined as at 41 and is fitted to the external splines or toothed arbor parts 10, 13 and 14 (see Fig. 3). Due to the fact that a few thousandths tolerance is permissible in the broaching of the splines on the workpiece, and also in the making of the external splines or teeth on the arbor, there results a limited amount of play between the splined arbor and the workpiece. In order to take up this play and to securely center the workpiece on the arbor, the angular adjustment of the ring 14 in one direction or the other will actually produce an expansion of the teeth of the arbor assembly, and thus the workpiece is securely held.

The shank 45 of the arbor support may be constructed long or short, depending on the machine with which the arbor is to be used. The dot and dash showing of a machine part 46 is sufficient to indicate the mounting of the arbor in a machine.

A spring lock ring 50 is snapped into the external annular groove 51 in shaft 11 to hold the splined or toothed annular member 13 in place.

It will be apparent to those skilled in the art to which my invention pertains that various modifications or changes may be made therein without departing from the spirit of my invention or from the scope of the appended claims.

What I claim is:

1. A spline arbor comprising a support, a pair of axially spaced longitudinally splined annular portions carried by said support and having aligned substantially identical splines, an annular ring rotatably mounted on the support and located between said annular portions, said ring having splines substantially identical with the splines on said annular portions, a threaded shaft disposed axially of said support and rotatably supported thereby, a member longitudinally guided by said support and having an internally threaded axial bore engaging the threaded shaft whereby said member may be longitudinally moved in said support guide by rotation of said threaded shaft, said ring and member having a helical tongue and groove connection whereby longitudinal movement of said member causes annular adjustment of said ring relative to said support, said splines on said annular portions and said ring being adapted to engage internal splines on a workpiece to hold the workpiece centered on said support.

2. A spline arbor comprising a support, a pair of axially spaced longitudinally splined annular portions carried by said support and having aligned substantially identical splines, an annular ring rotatably mounted on the support and located between said annular portions, said ring having splines substantially identical with the splines on said annular portions, and means angularly adjusting said annular ring relative to said support comprising a member longitudinally adjustably supported by said support, said ring having an internal helical groove, said member having a projection engaged in said groove and means for longitudinally adjusting said member, said splines on said annular portions and ring being adapted to engage internal splines on a workpiece to hold same centered on said support.

3. A spline arbor comprising a support, a pair of axially spaced longitudinally splined annular portions carried by said support and having aligned substantially identical splines, an annular ring rotatably mounted on the support and located between said annular portions, said ring having splines substantially identical with the splines on said annular portions, and means angularly adjusting said annular ring relative to said support comprising a non-rotatable longitudinally adjustable member, guide means carried by said support for limiting said adjustable member to a straight line longitudinal adjustment with respect to said support, and camming means connecting said ring and member and operable by longitudinal movement of said member to angularly adjust said ring relative to said support, said splines on said annular portions and said ring being adapted to engage internal splines on a work-piece to hold same centered on said support.

4. A spline arbor comprising a support, a pair of axially spaced longitudinally splined annular portions carried by said support and having aligned substantially identical splines, an annular ring rotatably mounted on the support and located between said annular portions, said ring having splines substantially identical with the splines on said annular portions, and means angularly adjusting said annular ring relative to said support comprising a longitudinally adjustable non-rotatable member, an elongated slot extending longitudinally of said support portion on which said ring is rotatably mounted for providing a guide for said member to allow longitudinal movement only of said member, and cam means connecting said ring and said member and operable by longitudinal movement of said member to angularly adjust said ring relative to said support, said splines on said annular portions and said ring being adapted to engage internal splines on a workpiece to hold same centered on said support.

5. A spline arbor comprising a support, a pair of axially spaced longitudinally splined annular portions carried by said support and having aligned substantially identical splines, an annular ring rotatably mounted on the support and located between said annular portions, said ring having splines substantially identical with the splines on said annular portions, and means angularly adjusting said annular ring relative to said support comprising a longitudinally adjustable member, an elongated longitudinally extending slot in said support portion on which said ring is rotatably mounted for providing a guide for said member, said internal surface of said ring overlying said slot being provided with a helical groove, said member having a projection engaging in said helical groove, whereby said annular ring is angularly adjusted as aforesaid by movement of said member longitudinally of said slot, said splines on said annular portions and said ring being adapted to engage internal splines on a workpiece to hold same centered on said support.

6. A spline arbor comprising a support, a pair of axially spaced longitudinally splined annular portions carried by said support and having aligned substantially identical splines, an annular ring rotatably mounted on the support and located between said annular portions, said ring having splines substantially identical with the splines on said annular portions, and means angularly adjusting said annular ring relative to said support comprising a longitudinally adjustable member, an elongated longitudinally extending slot in said support portion on which said ring is rotatably mounted for providing a guide for said member, said internal surface of said ring overlying said slot being provided with a helical groove, said member having a projection engaging in said helical groove, whereby said annular ring is angularly adjusted as aforesaid by movement of said member longitudinally of said slot, said splines on said annular portions and said ring being adapted to engage internal splines on a workpiece to hold same centered on said support, and a threaded screw rotatably supported axially of said support and having a threaded engagement with said member and thereby operable to longitudinally adjust said member.

7. In a spline arbor, a support having an annular toothed portion and an extending shaft, a second annular toothed portion keyed and locked to the outer portion of the shaft, and located in axially spaced relation with said first mentioned toothed portion, said teeth of said annular portions being substantially identical and axially aligned, an annular ring rotatably mounted on said shaft between said annular portions and having teeth substantially identical with the teeth of said annular portions, an actuator longitudinally movably supported by said shaft and having one or more projections projecting beyond the external surface of said shaft, said ring having one or more internal helical grooves receiving the projections carried by said actuator, and means moving said actuator to adjust the angular position of said ring relative to said first and second annular portions, whereby to hold an internally toothed workpiece on said arbor and to hold same centered on said support.

8. In a spline arbor, a support having an annular toothed portion and an extending shaft, a second annular toothed portion keyed and locked to the outer portion of the shaft and located in axially spaced relation with said first mentioned toothed portion, said teeth of said annular portions being substantially identical with the teeth of said annular portions, an actuator longitudinally movably supported by said shaft and having one or more projections projecting beyond the external surface of said shaft, said ring having one or more internal helical grooves receiving the projections carried by said actuator, and an axial adjusting screw carried by said support and having a screw threaded engagement with said actuator, the rotation of said screw in either direction serving to advance or retract said actuator longitudinally of the shaft, the aforesaid movement of said actuator rotating said ring relative to said annular toothed portions, the toothed portions on said annular portions and said ring being adapted to engage internal teeth on a workpiece to hold same centered on said support.

ALBIN F. FALLON.

References Cited in the file of this patent

UNITED STATES PATENTS

| Number | Name | Date |
|---|---|---|
| 2,555,496 | Mackmann | June 5, 1951 |